United States Patent

[11] 3,568,003

| [72] | Inventor | John Arthur Pavie |
| | | Ottawa, Ontario, Canada |
| [21] | Appl. No. | 695,147 |
| [22] | Filed | Jan. 2, 1968 |
| [45] | Patented | Mar. 2, 1971 |
| [73] | Assignee | Northern Electric Company Limited |
| | | Montreal, Quebec, Canada |

[54] VOLTAGE MONITORING CIRCUIT AND METHOD
3 Claims, 2 Drawing Figs.

[52] U.S. Cl. .................................................. 317/135,
317/148.5, 307/313, 340/248
[51] Int. Cl. ........................................................ H03k 17/60,
H01h 47/32
[50] Field of Search .......................................... 317/148.5;
324/123, 133; 340/248, 248 (A), 253; 307/313;
317/135

[56] References Cited
UNITED STATES PATENTS
2,930,942   3/1960   Levine et al. ................... 317/148.5
3,117,238   1/1964   McNair, Jr. ...................... 307/235
3,195,018   7/1965   Giger ............................. 317/148.5
3,237,058   2/1966   Andregg ........................ 317/148.5

*Primary Examiner*—Lee T. Hix
*Assistant Examiner*—C. L. Yates
*Attorney*—Westell and Hanley

ABSTRACT: A PNP and an NPN transistor have their emitters connected. Four potentials to be monitored are connected with appropriate resistances to apply to the two collectors and to the two bases potentials so arranged that conduction will take place through the transistors when all potentials are functioning and no conduction will take place if any one of the potentials fail. An indicator is connected to indicate whether the transistors are conducting or not and this indicator therefore monitors the four potentials. Three voltages instead of four may be monitored with the fourth potential then necessary for causing conduction in the transistors being synthesized from two of the other three or independently supplied.

3,568,003

INVENTOR.
JOHN A. PAVIE
BY Westell & Hanley

VOLTAGE MONITORING CIRCUIT AND METHOD

This invention relates to means and a method for monitoring three or more voltages, and has specific application to a power supply providing various output voltages which may be of either polarity.

The invention may generally be applied to many situations where it is desired to have one common indication of the presence or absence of a number of voltages of mixed polarity.

Prior arrangements for monitoring a number of voltages have involved monitoring the state of each voltage separately providing individual indications of voltage failure. However, arrangements involving mechanical relays are both costly and large in size. Arrangements involving solid-state equivalents of mechanical relays are costly. Moreover an arrangement for providing a closed circuit indication, after removal of all power from the circuit, is difficult to achieve with solid state components.

It is an object of this invention to provide circuitry whereby three or more voltages may be monitored, where a single alarm indication will indicate the failure of any one of the monitored voltages, and in a preferable embodiment of the invention where the indication may be sustained with all the monitored voltages removed.

The use of a single indicator allows for a very compact circuit monitoring three or more voltages. Preferably the single indicator is a simple mechanical relay arranged to give continuity to the alarm if all power is removed from the monitoring circuitry.

The invention comprises circuitry including an NPN and a PNP transistor connected in series with the actuating element of a relay or indicator; and with the emitters connected together. Four voltages to be monitored are connected to the circuit thus described. A voltage to be monitored is connected to each of the transistor collectors with the polarities selected to create current flow through said transistors when correctly biased and with said current flow in sufficient amount to actuate the indicator to the position to indicate all monitored voltages are being supplied to the circuit. For such current flow the transistors must be biased on. Third and fourth voltages to be monitored are respectively connected to the base-biasing circuits for each transistor. In the case of the bias circuit for the PNP transistor the voltage to be monitored must be more negative than the transistor base-conducting potential. The base-biasing circuit is connected at one end to such voltage to be monitored and at the other end to a potential (not one of those monitored) less negative than the conducting level of the PNP transistor; and the base connection therefrom is arranged so that when connected and the voltage to be monitored is being supplied, the base is biased to cause the PNP transistor to conduct.

Conversely in the case of the bias circuit for the NPN transistor, the voltage to be monitored must be more positive than the transistor base-conducting potential, the base-biasing circuit is connected at one end to such voltage to be monitored and at the other end to a potential (not one of those monitored) less positive than the conducting level of the NPN transistor; and the base connection is arranged so that when connected and the voltage to be monitored is being supplied, the NPN transistor is conducting.

The operation of the circuit is that with the four monitored voltages connected and operative, the circuit through the emitter-collector of the two transistors conducts and holds the actuator in a first state to cause an indicator to indicate that all monitored voltages are being supplied. If the supply of either of the collector-connected monitored voltages terminates, conduction ceases through the actuator causing it to indicate a malfunction, i.e. that one of the four voltages is not being supplied (the actuator does not indicate which one). If the supply of either of the monitored voltages in the base-biasing circuits ceases, then the base of the transistor which it affects goes to a nonconducting level, conduction in the emitter-collector circuit ceases, and the actuator is again switched to indicate the failure of one of the four monitored voltages.

It will be obvious that, if desired, three voltages instead of four may be monitored by deriving two of the four voltages necessary for operation of the circuit from a single voltage to be monitored, by (for example) a voltage divider or by deriving one of the four voltages necessary for operation of the circuit by tapping said one voltage from a voltage divider (or equivalent) connected between a more positive voltage of those to be monitored and a less positive voltage of those to be monitored.

It will be noted that with four (or three) voltages monitored, the unmonitored voltage to which one of the base-biasing monitored voltages is connected may, given proper monitoring circuit values and location in the circuit be the same as the unmonitored voltage to which the other of the base-biasing monitored voltages is connected. Hence the two unmonitored voltages may be a single voltage and that may be an intermediate point in a line connecting the two base-biasing monitored voltages.

Preferably the indicator used is of the type which in its normal or nonenergized state indicates nonsupply of one of the four voltages and in its energized state indicates the four voltages are being supplied. Thus the indicator and circuit in this preferred form will have the advantage that if all power is removed from the circuit then the indicator will indicate (or continue to indicate) malfunction of one or more of the monitored voltages. Preferably the actuator for the indicator will be a simple electromechanical relay.

It will be noted that by cascading circuits in accord with the invention or by connecting them in tandem, with proper allocation of the voltages to be monitored, that many more voltages than four may be monitored using only a single indicator.

In drawings which illustrate a preferred embodiment of the invention:

Figure 1:
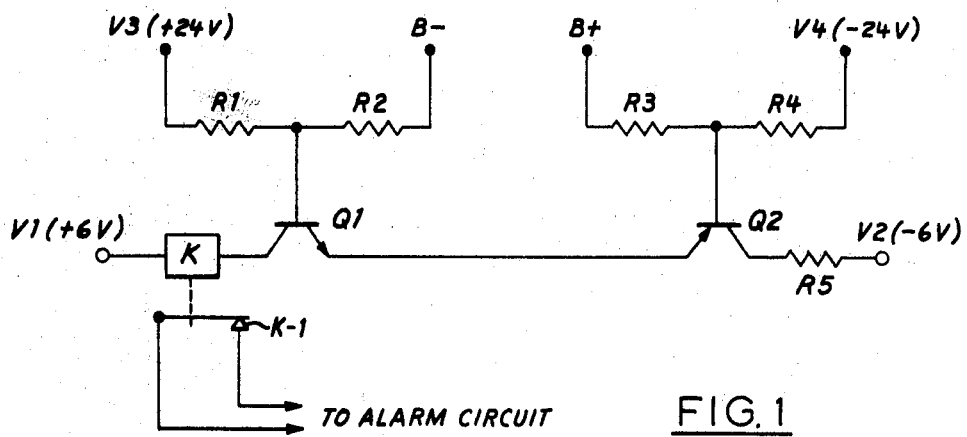
FIG. 1 shows a circuit embodying the invention.

In FIG. 1, four voltage supplies tabulated below are to be monitored:

| V1 | +6v. |
|----|------|
| V2 | −6v. |
| V3 | +24v. |
| V4 | −24v. |

These voltages are selected arbitrarily for the purpose of illustration and are not intended to be limiting. The criteria for the relative values of operative voltages are otherwise indicated herein and are defined in the claims.

V1 is connected through the actuator of an indicator or relay K (here the coil of an electromechanical relay) to the collector of a NPN transistor Q1. Associated with coil K is a set of break contacts K–1 and the contacts K–1 are constructed and arranged so that they will close and cause the indication of a malfunction when the relay is deenergized. V2 is connected through a resistor R5 to the collector of PNP transistor Q2. V1 must be more positive than V2 by a sufficient amount so that when the transistors are correctly biased into conduction, current will flow from V1 to V2 sufficient to energize actuator K.

V3 is connected through resistances R1 and R2 in series to a voltage B− as hereinafter discussed. B− is not one of the voltages to be monitored. The base of NPN transistor Q1 is connected between resistances R1 and R2.

V4 is connected through resistances R4 and R3 in series to a voltage B+ as hereinafter discussed. B+ is not one of the voltages to be monitored. The base of PNP transistor Q2 is connected between resistances R3 and R4.

V3 must be more positive than the conducting bias level of NPN transistor Q1 and B− must be less positive. R1 and R2 are chosen so that with V3 and B− connected, Q1 will be biased into conduction. It will be realized that if supply V3 fails, the base of Q1 approaches B− to a degree that conduction in Q1 is shut off.

V4 must be less positive than the conducting bias level of PNP transistor Q2 and B+ must be more positive. R3 and R4 are chosen so that with V4 and B+ connected, Q2 will be biased into conduction. It will be realized that if supply V4 fails the base of Q2 approaches B+ to a degree that conduction in Q2 is shut off.

R5 is included in series with the emitter-collector circuits of the transistors to limit the dissipation of current in such circuit.

In operation, if supplies V1, V2, V3 and V4 are being provided conduction takes place through the transistors energizing K and maintaining contacts K-1 open indicating all supplies operative. If V1 or V2 fails or is disconnected, conduction halts through K and contacts K-1 close to indicate a malfunction. If V3 fails Q1 falls to B− or if V4 fails Q2 rises to B+ and in either event conduction is shut off, deenergizing relay K, and causing A to indicate a malfunction.

It is also noted that since contacts K-1 cause a malfunction indication in their deenergized state then such indication will be given even if all power is removed.

Figure 2:
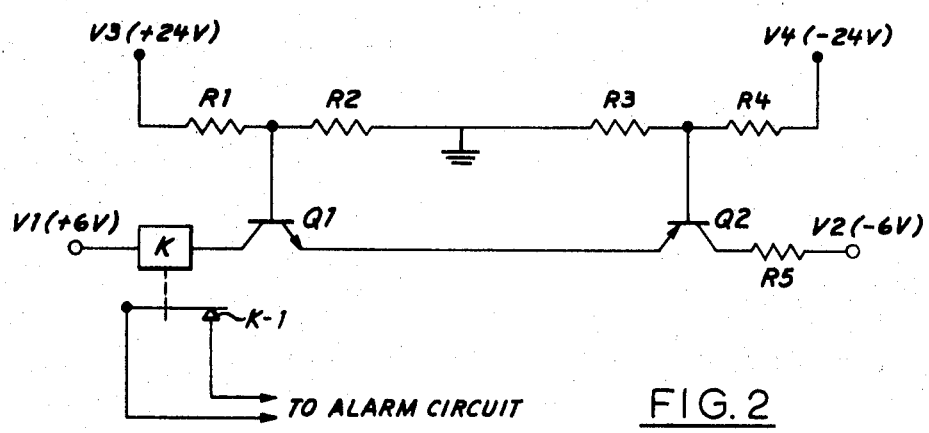
FIG. 2 shows an alternative circuit embodying the invention.

The embodiment of FIG. 2 is perhaps best explained by further reference to FIG. 1. It will be noted in FIG. 1 that with the proper location and selection of voltages for connection at V1 to V4 inclusive, B− may equal B+, i.e. B− = B+ may be below the conduction level for Q1 and above the conduction level for Q2. Thus it will be seen that B− and B+ may be a single supply. It will be noted that, as shown in FIG. 2 such single supply may be replaced by ground and hence the B+ or B− supply may not be needed at all and the bias conducting points for Q1 and Q2 with V3 and V4 operating, may be obtained by connecting V3 to V4 through the resistances R1, R2, R3 and R4 in series and tapping of the base bias voltages between R1 and R2 and between R3 and R4, as shown.

With the circuit of FIG. 2 if V1 or V2 fails, K is deenergized to give the malfunction indication. If V3 fails the base of Q1 falls to V4 cutting off conduction in Q1 with K giving the malfunction indication. Conversely if V4 fails, the base of Q2 rises to V3 cutting off conduction in Q2 with K giving the alarm indication.

If the ratings of the transistors Q1 or Q2 are sufficient, the ground in FIG. 2 may be dispensed with, since without the ground, the resistances may still be selected to provide, under operative conditions, the correct bias voltage value for conduction in Q1 and Q2, will be obtained by tapping between R1 and R2 and between R3 and R4 respectively. The reason the ratings of the transistors Q1 and Q2 become more critical is that: while in FIG. 2, with the ground connection, failure of V3 or V4 will merely make the base of Q1 or Q2 approach ground; on the other hand, if the ground is left out, failure of V3 or V4 will make the base of Q1 and Q2 approach the non-failing one of V3 or V4, thus placing larger strains on one or both the transistors.

If it is desired, as in FIG. 2 to tie the connection between R2 and R3 to potential then it will be obvious that this may be a potential other than ground. Moreover, if desired, the potential wanted at the connection between R2 and R3 may be sometimes obtained by inserting in the connection to ground a resistance of the value to create the desired potential between R2 and R3.

I claim:

1. Circuitry for monitoring direct current supply voltages comprising:
   a PNP transistor and an NPN transistor having their emitters together connected;
   the collector of the NPN transistor being connected to a first direct current supply voltage and the collector of the PNP transistor connected to a second direct current supply voltage;
   an indicator actuator in series with the emitter-collector circuits of said first and second transistors between said first and second supply voltages;
   said indicator actuator being designed to assume alternative states and to cause an indicator to give alternative indications corresponding to said states;
   said first supply voltage being more positive than said second supply voltage by an amount sufficient to sustain conduction and to hold said actuator in one of said alternate states in said emitter-collector circuit when said transistors are conducting;
   said actuator being designed to assume the other of said alternate states when said transistors are nonconducting;
   a third direct current supply voltage connected through a first biasing circuit to a point at a predetermined potential level;
   a connection from a predetermined location in said first biasing circuit to the base of said NPN transistor;
   the level of said third supply voltage being more positive and the level of said potential level being less positive than the base voltage for conduction in said NPN transistor;
   said location being selected to bias said NPN transistor into conduction;
   a fourth direct current supply voltage being connected through a second biasing circuit to the base of said PNP transistor;
   the level of said fourth supply voltage being less positive and the level of said last-mentioned potential level being more positive than the base voltage for conduction, in said PNP transistor;
   said last-mentioned location being selected to bias said PNP transistor into conduction in said series circuit; and
   where each of said first, second, third and fourth supply voltages are independent of the other and at least three of said last-mentioned supply voltages are voltages to be monitored.

2. A device as claimed in claim 1 wherein said indicator actuator is designed to have an energized state and a deenergized state and to indicate malfunction when deenergized.

3. A device as claimed in claim 1 wherein said indicator actuator is an electromechanical relay.